Aug. 30, 1927.
A. A. ALLEN
1,640,916
AUTOMATIC BRAKE MECHANISM
Filed Nov. 19, 1925
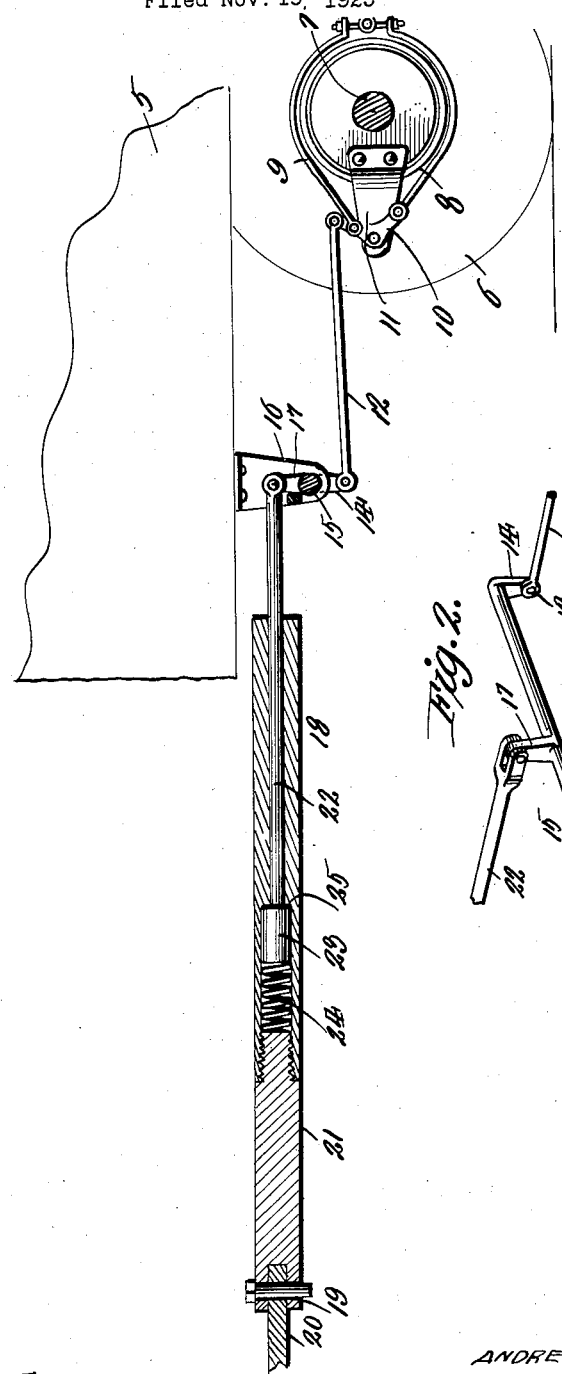
WITNESSES
Inventor
ANDREW A. ALLEN
By Richard B. Owen
Attorney Patented Aug. 30, 1927.

1,640,916

UNITED STATES PATENT OFFICE.

ANDREW A. ALLEN, OF MARICOPA, CALIFORNIA.

AUTOMATIC BRAKE MECHANISM.

Application filed November 19, 1925. Serial No. 70,195.

This invention relates to automatic brake mechanisms, and has more particular reference to a device of this kind particularly adapted for use upon a trailer vehicle for causing automatic application of the brakes of the trailer vehicle when the latter tends to travel forwardly at a greater speed than the vehicle pulling the trailer, and to automatically release the brakes of the trailer vehicle when the latter tends to lag behind the pulling vehicle.

The primary object of the invention is to provide a brake mechanism of the above kind which is extremely simple and durable in construction as well as efficient in operation.

Another object of the invention is to provide a brake mechanism of the above kind wherein the application of the brakes of the trailer vehicle is yieldingly or gradually effected for avoiding severe shock.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts in both of the views.

Figure 1 is a fragmentary view partly in elevation and partly in longitudinal section, illustrating a brake mechanism constructed in accordance with the present invention, and Figure 2 is a fragmentary perspective view illustrating a detail of the construction shown in Figure 1.

Referring more in detail to the drawing, 5 indicates the body of a trailer vehicle having supporting wheels, one of which is shown as 6 in Figure 1. The rear supporting wheels of a trailer vehicle are usually journaled upon the ends of an axle 7, and each carries a brake drum 8 with which is associated a conventional form of contracting brake band 9 whose ends are connected to a bell crank lever 10 which is pivoted upon a suitable bracket 11 supported by the axle 7. Each bell crank lever 10 has the rear end of a link 12 pivoted thereto so that when the link is moved forwardly the brake band 9 is contracted into engagement with the drum 8 or applied, and so that when the link 12 is forced rearwardly the band 9 is expanded or released.

The links 12 of the pair of brakes of a trailer vehicle usually have their forward ends pivoted as at 13 to depending rigid arms 14 provided upon the ends of a transverse rock shaft 15, so that when the shaft 15 is rocked, simultaneous application or release of the two brakes of the vehicle is had. The rock shaft 15 is shown as journaled in suitable brackets, one of which is illustrated at 16 in Figure 1 and suitably secured to the body of the trailer.

The rock shaft 15 has a rigid upwardly projecting arm 17 which is pivoted to the rear end of a draft tongue 18 whose forward end is suitably adapted as indicated at 19 for detachable connection with the draw bar 20 of a pulling or towing vehicle, not shown.

The draft tongue 18 preferably consists of a bar 21, the rear end portion of which is provided with a central or axial bore in which is longitudinally slidable a rod 22 forming the rear section of the draft tongue whose rear end is pivoted to the arm 17. The bore of the bar 21 is enlarged at its inner or forward end, and longitudinally slidable in this enlarged bore portion is a cylindrical head 23 rigid upon the forward end of the rod 22. A helical compression spring 24 is disposed in the enlarged portion of the bore of the bar 21 between the forward end of the bore and the forward end of the head 23 so that the latter is normally urged rearwardly into engagement with the annular shoulder 25 formed internally of the bar 21 at the rear end of the enlarged bore portion of the same.

In operation, upon forward traveling movement of the pulling vehicle, a forward pull is exerted upon the bar 21 and the rod 22 by reason of the engagement of the head 23 with the shoulder 25. This forward pull rocks the shaft 15 by moving the member or arm 17 forwardly so that the arms 14 are swung rearwardly to force the links 12 rearwardly and release the brake bands 9. However, should the trailer vehicle tend to travel faster than the pulling vehicle the draft tongue will exert a rearward force on arm 17 so as to rock the shaft 15 and cause a forward pull to be exerted upon the links 12 for applying the brakes. The application of the brakes will be yieldingly effected, in a gradual manner by reason of the fact that the rod 22 will be allowed to move forwardly relative to the bar 21 by the spring 24, during which action said spring 24 is gradually placed under increased compression. This yieldable action of the draft tongue prevents sudden application of the brakes such as would cause objectionable jolting from sudden stopping of the trailer. It is apparent that the degree of application of the brakes will vary proportional to the degree of force exerted by the tendency of the trailer to travel faster than the pulling vehicle. As soon as the trailing vehicle tends to lag behind the pulling vehicle, the spring 24 will expand until the head 23 engages the shoulder 25, whereupon the trailer is effectively drawn ahead with the brakes fully released.

It is believed that the construction and operation as well as the advantages of the present invention will be readily understood and appreciated by those skilled in the art.

Minor changes may be made without departing from the spirit and scope of the invention and claimed.

What I claim as new is:

1. In a combined draft and brake operating structure for trailer vehicles equipped with braking means and an operating element therefore, a relatively long bar body formed in two sections, one of said sections having a longitudinally extending bore formed therethrough, said bore for a portion of its length being of relatively large diameter and provided with means to receive and hold one end of the other bar section, a rod member longitudinally shiftable in that portion of said bore of smaller diameter and having an enlarged head upon the inner end slidably positioned in the larger portion of the bore, a compressible element arranged in the larger portion of said bore between said head and the inserted end of the other bar section, means securing the other end of the rod to the brake means operating element and means for connecting the free end of said other bar section to a vehicle.

2. In combination, a vehicle brake structure, reciprocable operating rods therefore, an oscillatory bar arranged transversely of said rod and connected thereto to cause reciprocation of the same, a connecting arm carried by said oscillatory bar, a draft bar comprising a main body portion, longitudinally bored through a portion of its length, a rod member slidably positioned in the bore of said bar and having the outer end connected with the arm of said oscillatory bar, means to prevent the inner end of said rod from being withdrawn from said bore, and a cushion element housed within said bar at the inner end of and designed to be acted upon by said rod upon retardation of the forward movement of the draft bar to effect the oscillation and reciprocation of said oscillatory bar and brake operating rod respectively and the application of said brakes.

In testimony whereof I affix my signature.

ANDREW A. ALLEN.